United States Patent
Crisman et al.

(10) Patent No.: US 12,545,888 B2
(45) Date of Patent: Feb. 10, 2026

(54) NANOBUBBLES FOR ANAEROBIC PROCESSES

(71) Applicant: Moleaer, Inc., Carson, CA (US)

(72) Inventors: John William Crisman, Eudora, KS (US); Andrea Renee Turriciano White, Sparks, NV (US)

(73) Assignee: Moleaer, Inc., Hawthorne, CA (US)

( * ) Notice: Subject to any disclaimer, the term of this patent is extended or adjusted under 35 U.S.C. 154(b) by 0 days.

(21) Appl. No.: 18/674,014

(22) Filed: May 24, 2024

(65) Prior Publication Data

US 2024/0392236 A1    Nov. 28, 2024

Related U.S. Application Data

(60) Provisional application No. 63/469,302, filed on May 26, 2023.

(51) Int. Cl.
*C12N 1/34*    (2006.01)
*C02F 3/26*    (2023.01)
*C02F 3/28*    (2023.01)

(52) U.S. Cl.
CPC .................. *C12N 1/34* (2013.01); *C02F 3/26* (2013.01); *C02F 3/28* (2013.01)

(58) Field of Classification Search
None
See application file for complete search history.

(56) References Cited

U.S. PATENT DOCUMENTS

| | | | |
|---|---|---|---|
| 7,641,802 B2 | 1/2010 | Yamasaki et al. | |
| 10,377,651 B2 | 8/2019 | Zimmerman et al. | |
| 10,591,231 B2 | 3/2020 | Russell et al. | |
| 11,331,633 B2 | 5/2022 | Scholten et al. | |
| 2013/0092626 A1 | 4/2013 | Zimmerman et al. | |

FOREIGN PATENT DOCUMENTS

| | | |
|---|---|---|
| CN | 110668522 | 1/2020 |
| CN | 114875078 A  * | 8/2022 |
| CN | 117305380 A | 12/2023 |
| EP | 3894362 | 10/2021 |
| WO | WO 2018/215040 | 11/2018 |

(Continued)

OTHER PUBLICATIONS

Rameshkumar et al., Desalination and Water Treatment, 2019, 164:98-101 (Year: 2019).*

(Continued)

*Primary Examiner* — Manjunath N Rao
*Assistant Examiner* — Qing Xu
(74) *Attorney, Agent, or Firm* — Fish & Richardson P.C.

(57) ABSTRACT

Provided herein are methods and systems for treating a stream comprising material (e.g., biomass such as plant biomass, animal biomass, agricultural biomass, wastewater sludge, or a combination thereof) with nanobubbles. One such method includes generating nanobubbles in wastewater sludge of a wastewater treatment system to produce nanobubble-containing sludge, the wastewater sludge having a higher solids content than an input stream to the wastewater treatment system, and processing the nanobubble-containing sludge in an anaerobic reactor of the wastewater treatment system.

13 Claims, 7 Drawing Sheets

(56) References Cited

FOREIGN PATENT DOCUMENTS

WO    WO 2022/229977    11/2022

OTHER PUBLICATIONS

Singh et al., Appl. Sci. 2025, 15:1197, pp. 1-40. (Year: 2025).*
Al-Mashhadani et al., "Carbon dioxide rich microbubble acceleration of biogas production in anaerobic digestion," Chemical Engineering Science, Dec. 15, 2016, 156:24-35.
Chuenchart et al., "Nanobubble technology in anaerobic digestion: A review," Bioresource Technology, Jun. 1, 2021, 329:124916.
Coyne et al., "Anaerobic Digestion Fundamentals," Water Environment Federation, 2017, 6 pages.
Flandershealth.us [online], "Alkalinity and pH," Mar. 8, 2024, retrieved Jun. 6, 2024, retrieved from URL <https://www.flandershealth.us/anaerobic-digesters/alkalinity-and-ph.html#:~:text=Most%20anaerobic%20bacteria%2C%20including%20methane-forming%20bacteria%2C%20perform%20well,pH%20of%20the%20digester%20increases%20and%20then%20stabilizes>, 3 pages.
Fu et al., "Micro-aeration: an attractive strategy to facilitate anaerobic digestion," Trends in Biotechnology, May 1, 2023, 41(5):714-726.
Garcia et al., "Inhibition of biogas production by alkyl benzene sulfonates (LAS) in a screening test for anaerobic biodegradability," Biodegradation, Feb. 2006, 17:39-46.
He et al., "Enhancement of methane production by anaerobic digestion of corn straw with hydrogen-nanobubble water," Bioresource Technology, Jan. 1, 2022, 344:126220.
Nghiem et al., "Oxidation reduction potential as a parameter to regulate micro-oxygen injection into anaerobic digester for reducing hydrogen sulphide concentration in biogas," Bioresource Technology, Dec. 1, 2014, 173:443-447.
Pilli et al., "Pre-treatment Technologies to Enhance Anaerobic Digestion," Sustainable Sewage Sludge Management and Resource Efficiency, Jul. 21, 2020, 1-28.
Rashvanlou et al., "Effect of micro-aerobic process on improvement of anaerobic digestion sewage sludge treatment: flow cytometry and ATP assessment," RSC Advances, 2020, 10(59):35718-35728.
Wang et al., "Enhanced hydrolysis and acidification of cellulose at high loading for methane production via anaerobic digestion supplemented with high mobility nanobubble water," Bioresource Technology, Feb. 1, 2020, 297:122499.
Yang et al., "Enhanced hydrolysis of waste activated sludge for methane production via anaerobic digestion under N2-nanobubble water addition," Science of The Total Environment, Nov. 25, 2019, 693:133524.
International Search Report and Written Opinion in International Appln. No. PCT/US2024/31023, mailed on Oct. 9, 2024, 13 pages.

* cited by examiner

202 ↘

Generating nanobubbles in wastewater sludge to produce nanobubble-containing sludge, in which a dissolved oxygen content of the wastewater sludge is substantially the same as a dissolved oxygen content of the nanobubble-containing sludge Processing the nanobubble-containing sludge in an anaerobic reactor of the wastewater treatment system

204

Generating nanobubbles in wastewater sludge to produce nanobubble-containing sludge, in which the wastewater sludge has a solids concentration of at least 1,200 mg/L Processing the nanobubble-containing input stream in an anaerobic reactor

NANOBUBBLES FOR ANAEROBIC PROCESSES

CROSS-REFERENCE TO RELATED APPLICATIONS

This application claims the benefit of priority to U.S. Application No. 63/469,302, filed on May 26, 2023, the contents of which are incorporated here by reference in their entirety.

TECHNICAL FIELD

This disclosure relates to systems and methods for enhancing anaerobic processes with nanobubbles.

BACKGROUND

Biomass includes contaminants and pathogens that pose a threat to the environment, the climate, and human health. Biomass also includes organic matter and nutrients that allow post-treated biomass lacking contaminants and pathogens to be used for a variety of purposes such as fertilizer, electricity, heat, and fuel.

SUMMARY

The inventors have discovered that anaerobic processing of material such as biomass (e.g., plant biomass, animal biomass, agricultural biomass, wastewater sludge, or a combination thereof) is enhanced by generating nanobubbles in a stream containing the material. Methods described herein involve generating nanobubbles in various systems including, but not limited to, wastewater treatment systems, energy production systems, fertilizer production systems, and anaerobic fermentation systems. In some embodiments, methods described herein involve generating nanobubbles in various types of sludge produced during wastewater treatment including, but not limited to, primary sludge, activated sludge, waste activated sludge, return activated sludge, or combinations thereof.

Accordingly, aspects of the present disclosure provide a method comprising generating nanobubbles in a stream of a system to produce a nanobubble-containing stream; and processing the nanobubble-containing stream in an anaerobic reactor of the system, wherein the stream has a solids concentration of at least 1,200 mg/L.

In some embodiments, a dissolved oxygen content of the stream is substantially the same as a dissolved oxygen content of the nanobubble-containing stream.

In some embodiments, the stream has a solids concentration that is between 1,200 mg/L and 90,000 mg/L.

In some embodiments, the stream has a dry solids content of at least 0.12% by weight. In some embodiments, the stream has a dry solids content that is between at least 0.12% and at least 4.5% by weight.

In some embodiments, the gas is selected from air, argon, hydrogen, biogas, methane, carbon dioxide, nitrogen, oxygen, or ozone.

In some embodiments, the stream comprises biomass. In some embodiments, the biomass comprises plant biomass, animal biomass, agricultural biomass, wastewater sludge, or a combination thereof.

In some embodiments, the system comprises at least one nanobubble generator.

In some embodiments, the system is a wastewater treatment system, an energy production system, a fertilizer production system, or an anaerobic fermentation system. In some embodiments, the system is a wastewater treatment system, and the stream comprises wastewater sludge.

Aspects of the present disclosure provide a method comprising generating nanobubbles in a stream of a system to produce a nanobubble-containing stream; and processing the nanobubble-containing stream in an anaerobic reactor of the system, wherein the stream has a chemical oxygen demand of at least 2000 mg/L and/or the stream has a biological oxygen demand of at least 1000 mg/L.

In some embodiments, the stream has a chemical oxygen demand that is between 2000 mg/L and 5,000,000 mg/L.

In some embodiments, the stream has a biological oxygen demand that is between 1000 mg/L and 2,500,000 mg/L.

Accordingly, aspects of the present disclosure provide a method comprising generating nanobubbles in wastewater sludge of a wastewater treatment system to produce nanobubble-containing sludge, the wastewater sludge having a higher solids content than an input stream to the wastewater treatment system; and processing the nanobubble-containing sludge in an anaerobic reactor of the wastewater treatment system.

In some embodiments, methods comprise separating the input stream into a liquid stream and primary sludge, wherein the wastewater sludge is based on the primary sludge.

In some embodiments, generating nanobubbles in wastewater sludge comprises generating nanobubbles in the primary sludge.

In some embodiments, methods comprise thickening the primary sludge, and generating nanobubbles in wastewater sludge comprises generating nanobubbles in the thickened primary sludge.

In some embodiments, methods comprise generating nanobubbles in the primary sludge to generate nanobubble-containing primary sludge, and thickening the nanobubble-containing primary sludge.

In some embodiments, separating the input stream comprises processing the input stream using one or more of a clarifier, chemically enhanced primary treatment, high-rate clarification, primary effluent filtration, primary filtration, rotating belt filtration, microscreens, or dissolved air flotation clarifier.

In some embodiments, methods comprise separating the input stream in a solid-liquid separator of the wastewater treatment system.

In some embodiments, methods comprise providing a liquid stream output from the anaerobic reactor to the solid-liquid separator.

In some embodiments, methods comprise processing the input stream to generate waste activated sludge, wherein the wastewater sludge is based on the waste activated sludge.

In some embodiments, generating nanobubbles in wastewater sludge comprises generating nanobubbles in the waste activated sludge.

In some embodiments, methods comprise thickening the waste activated sludge; and in which generating nanobubbles in wastewater sludge comprises generating nanobubbles in the thickened waste activated sludge.

In some embodiments, processing the input stream to generate waste activated sludge comprises processing a liquid stream separated from the input stream.

In some embodiments, methods comprise generating the waste activated sludge in a biological reactor of the wastewater treatment system.

In some embodiments, processing the input stream in a biological reactor comprises processing the input stream under aerobic conditions.

In some embodiments, methods comprise outputting, from the biological reactor, the waste activated sludge and a second liquid stream.

In some embodiments, methods comprise separating the second liquid stream into return sludge and a third liquid stream; and providing the return sludge to the biological reactor.

In some embodiments, separating the second liquid stream comprises separating the second liquid stream using one or more of a secondary clarifier or membrane filtration.

In some embodiments, generating nanobubbles in wastewater sludge comprises generating nanobubbles in wastewater sludge output from the anaerobic reactor.

In some embodiments, methods comprise heating or cooling the wastewater sludge output from the anaerobic reactor before and/or after generating the nanobubbles in the wastewater sludge.

In some embodiments, methods comprise heating or cooling the wastewater sludge output from the anaerobic reactor by flowing the wastewater sludge from the anaerobic reactor through a heat exchanger.

In some embodiments, the wastewater sludge comprises waste activated sludge having a solids concentration of at least 1,200 mg/L.

In some embodiments, the wastewater sludge comprises waste activated sludge having a solids concentration of at least 4,800 mg/L.

In some embodiments, the wastewater sludge comprises waste activated sludge having a solids concentration of at least 45,000 mg/L.

In some embodiments, the wastewater sludge comprises primary sludge having a solids concentration of at least 15,000 mg/L.

In some embodiments, the wastewater sludge comprises primary sludge having a solids concentration of at least 45,000 mg/L.

In some embodiments, the wastewater sludge comprises waste activated sludge having a dry solids content of at least 0.12% by weight.

In some embodiments, the wastewater sludge comprises waste activated sludge having a dry solids content of at least 0.48% by weight.

In some embodiments, the wastewater sludge comprises waste activated sludge a dry solids content of at least 4.5% by weight.

In some embodiments, the wastewater sludge comprises primary sludge having a dry solids content of at least 1.5% by weight.

In some embodiments, the wastewater sludge comprises primary sludge having a dry solids content of at least 4.5% by weight.

In some embodiments, generating nanobubbles comprises generating nanobubbles of air, hydrogen, biogas, methane, carbon dioxide, nitrogen, oxygen, or ozone.

In some embodiments, methods comprise a dissolved oxygen content of the wastewater sludge that is substantially the same as a dissolved oxygen content of the nanobubble-containing sludge.

In some embodiments, methods comprise providing a first portion of the input stream to the anaerobic reactor, and comprising separating a second portion of the input stream into a liquid stream and a solids stream, wherein generating nanobubbles in wastewater sludge comprises generating nanobubbles in a stream based on the solids stream.

In some embodiments, methods comprise generating nanobubbles in the first portion of the input stream to produce a nanobubble-containing input stream; and providing the nanobubble-containing input stream to the anaerobic reactor.

In some embodiments, methods comprise thickening sludge separated from the input stream to produce the wastewater sludge.

In some embodiments, the sludge comprises activated sludge received from a biological reactor of the wastewater treatment system.

In some embodiments, the sludge comprises primary sludge separated from the input stream.

In some embodiments, thickening the sludge comprises producing the wastewater sludge and a third liquid stream, and comprising providing the third liquid stream to a separator that separates the primary sludge from the input stream.

In some embodiments, thickening the sludge comprises processing the sludge using one or more of dissolved air flotation, a centrifuge, a gravity belt thickener, gravity, or a rotary drum thickener.

Aspects of the present disclosure provide methods comprising generating nanobubbles in wastewater sludge of a wastewater treatment system to produce nanobubble-containing sludge, in which a dissolved oxygen content of the wastewater sludge is substantially the same as a dissolved oxygen content of the nanobubble-containing sludge; and processing the nanobubble-containing sludge in an anaerobic reactor of the wastewater treatment system.

In some embodiments, generating nanobubbles comprises generating nanobubbles of an oxygen containing gas.

In some embodiments, the oxygen containing gas is air.

In some embodiments, methods comprise generating nanobubbles comprises generating nanobubbles of air, hydrogen, biogas, methane, carbon dioxide, nitrogen, oxygen, or ozone.

Aspects of the present disclosure provide methods comprising generating nanobubbles in wastewater sludge of a wastewater treatment system to produce nanobubble-containing sludge, in which the wastewater sludge has a solids concentration of at least 1,200 mg/L; and processing the nanobubble-containing sludge in an anaerobic reactor of the wastewater treatment system.

In some embodiments, the solids concentration is between at least 1,200 mg/L and at least 90,000 mg/L.

In some embodiments, generating nanobubbles comprises generating nanobubbles of an oxygen containing gas.

In some embodiments, the oxygen containing gas is air.

In some embodiments, generating nanobubbles comprises generating nanobubbles of air, hydrogen, biogas, methane, carbon dioxide, nitrogen, oxygen, or ozone.

Aspects of the present disclosure provide a system comprising a nanobubble generator configured to generate nanobubbles in biomass to produce nanobubble-containing biomass, the biomass having a higher solids content than an input stream to the system; and an anaerobic reactor configured to process the nanobubble-containing biomass.

In some embodiments, the present disclosure provides a wastewater treatment system comprising a nanobubble generator configured to generate nanobubbles in wastewater sludge of a wastewater treatment system to produce nanobubble-containing sludge, the wastewater sludge having a higher solids content than an input stream to the wastewater treatment system; and an anaerobic reactor configured to process the nanobubble-containing sludge.

In some embodiments, the system comprises a first solid-liquid separation module configured to separate the input stream into primary sludge and a first liquid stream, in which the wastewater sludge is based on the primary sludge.

In some embodiments, the nanobubble generator is positioned along a flow path between the first solid-liquid separation module and the anaerobic reactor.

In some embodiments, the first solid-liquid separation module comprises a first solid-liquid separator.

In some embodiments, the system comprises a first thickener configured to thicken the primary sludge to generate the wastewater sludge.

In some embodiments, the nanobubble generator is positioned along a flow path between the first thickener and the anaerobic reactor.

In some embodiments, the nanobubble generator is positioned along a flow path upstream of the first thickener.

In some embodiments, the system comprises a return flow pathway connecting the anaerobic reactor to the first solid-liquid separation module.

In some embodiments, the system comprises a sludge activation module configured to process a first liquid stream separated from the input stream and to output activated sludge and a second liquid stream, in which the wastewater sludge is based on the activated sludge.

In some embodiments, the nanobubble generator is positioned along a flow path between the sludge activation module and the anaerobic reactor.

In some embodiments, the sludge activation module comprises a biological reactor.

In some embodiments, the system comprises a second thickener configured to thicken the activated sludge to generate the wastewater sludge.

In some embodiments, the nanobubble generator is positioned along a flow path between the second thickener and the anaerobic reactor.

In some embodiments, the nanobubble generator is positioned along a flow path between the sludge activation module and the second thickener.

In some embodiments, the system comprises a second solid-liquid separation module configured to separate the second liquid stream into return activated sludge and a third liquid stream; and a return sludge flow pathway connecting the second solid-liquid separation module to the biological reactor.

In some embodiments, the nanobubble generator is positioned along a recirculating flow path connected to the anaerobic reactor.

In some embodiments, the system comprises a heat exchanger disposed along the recirculating flow path.

In some embodiments, the system comprises an input nanobubble generator positioned along an input flow path into the anaerobic reactor, the second nanobubble generator configured to generate nanobubbles in the input stream.

Aspects of the present disclosure provide a method comprising generating nanobubbles in an input stream of a wastewater treatment system to produce a nanobubble-containing input stream; and processing the nanobubble-containing input stream in an anaerobic reactor of the wastewater treatment system.

The methods and systems described herein are directed to generating nanobubbles in in material such as biomass (e.g., plant biomass, animal biomass, agricultural biomass, wastewater sludge, or a combination thereof), which provides several improvements over conventional methods. Such improvements include, but are not limited to:

(a) Reduced chemical sequestrant cost and disposal resulting at least in part from reduced hydrogen sulfide production resulting in decreased concentrations in biogas produced in systems (e.g., wastewater treatment systems, energy production systems, fertilizer production systems, or anaerobic fermentation systems) including nanobubble-containing in material such as biomass compared to systems including conventional material (e.g., biomass) that lacks nanobubbles.

(b) Reduced residual biosolids disposal and hauling costs resulting at least in part from improved fermentation and further reduction of volatile organic matter in the nanobubble-containing material (e.g., nanobubble-containing biomass) compared to systems including conventional material (e.g., biomass) that lacks nanobubbles.

(c) Reduced capital costs resulting at least in part from increased organic loading in systems (e.g., wastewater treatment systems, energy production systems, fertilizer production systems, or anaerobic fermentation systems) including nanobubble-containing material (e.g., nanobubble-containing biomass) compared to systems including conventional material (e.g., biomass) that lacks nanobubbles.

(d) Increased biogas availability for facility energy offset resulting at least in part from improved process stabilization and alkalinity recovery in nanobubble-containing material (e.g., nanobubble-containing biomass) compared to conventional material (e.g., biomass) that lacks nanobubbles.

(e) Reduced facility downtime and reduced operation and maintenance costs resulting at least in part from reduced foam and scum formation in nanobubble-containing material (e.g., nanobubble-containing biomass) compared to conventional material (e.g., biomass) that lacks nanobubbles.

(f) Increased processing efficiency resulting at least in part from direct injection of nanobubbles into the material (e.g., biomass), which avoids dilution of the material entering the anaerobic digester that occurs when nanobubble-containing water is pre-injected into the material.

(g) Continual operation of the anaerobic digester and accessibility of the nanobubble generator for repairs resulting at least in part from systems including one or more nanobubble generators that are independent from (e.g., external to) the anaerobic digester.

Other features and advantages of the invention will be apparent from the following detailed description, and from the claims.

DETAILED DESCRIPTION

Following below are more detailed descriptions of various concepts related to, and exemplary embodiments of, inventive methods and systems related to treating biomass (e.g., (e.g., plant biomass, animal biomass, agricultural biomass, wastewater sludge, or a combination thereof) with nanobubbles. In some embodiments, the methods and systems described herein relate to anaerobic digestion of nanobubble-containing biomass.

Any of the methods and systems described herein can include generating nanobubbles in biomass. The following descriptions relate to treatment of wastewater sludge, and are not intended to limit the scope of the methods and systems described herein. The methods and systems described herein are applicable to treatment of any biomass sludge including, but not limited to, plant biomass, animal biomass, agricultural biomass, wastewater sludge, or a combination thereof.

Figure 1A:
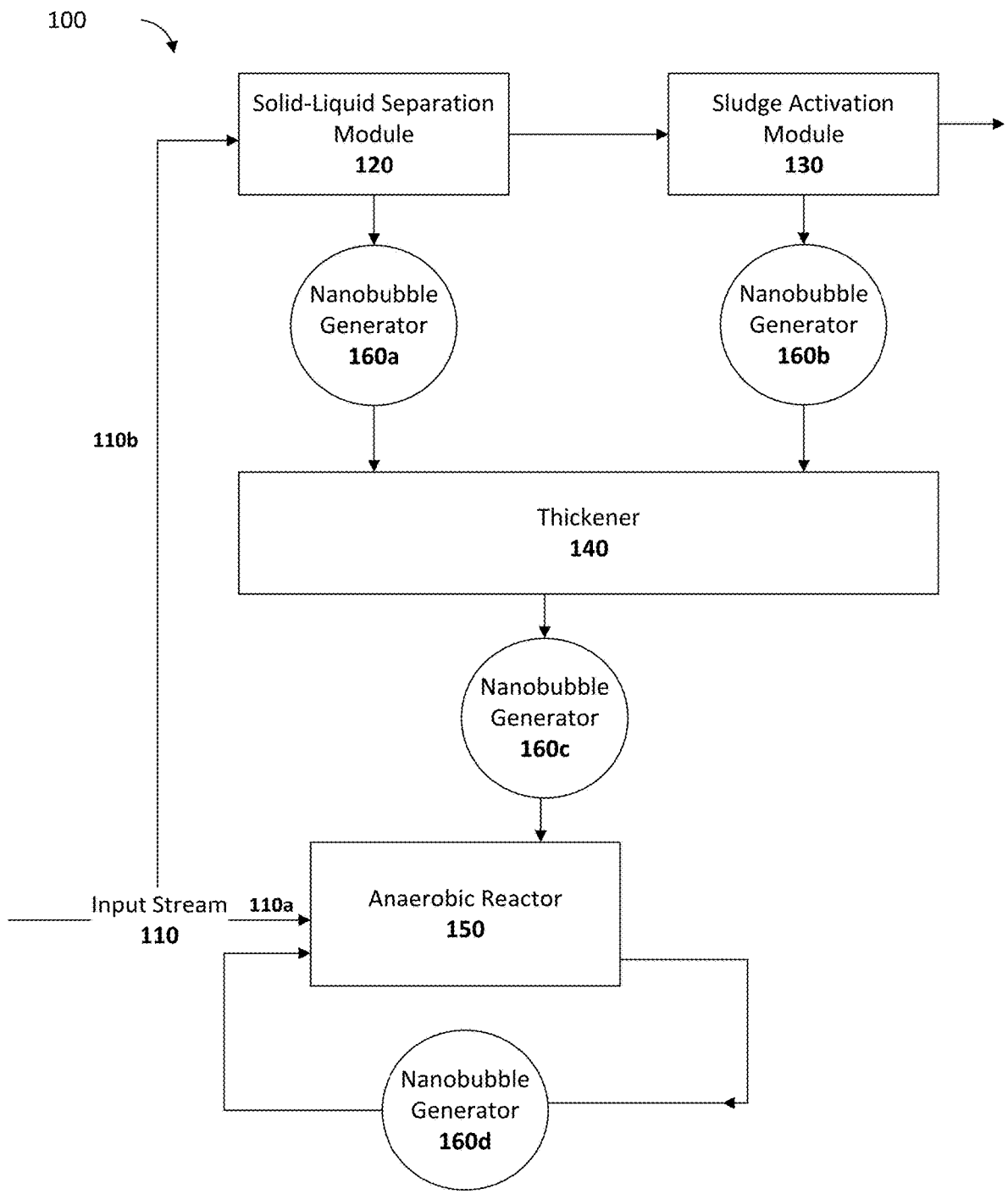
FIGS. 1A-1C are schematic illustrations of example systems for treating wastewater sludge with nanobubbles.

Referring to FIG. 1A, an example method for treating wastewater sludge with nanobubbles in an example wastewater treatment system 100 is described.

A first portion 110a of an input stream 110 is flowed into an anaerobic reactor 150 where anaerobic digestion is performed. Anaerobic digestion and anaerobic reactors are described in further detail in the section entitled "Anaerobic Digestion and Anaerobic Reactors".

Nanobubbles can be generated in sludge output from the anaerobic reactor 150 by flowing the output through a nanobubble generator 160d positioned along a recirculating flow path connecting nanobubble generator 160d with the anaerobic reactor 150. Nanobubbles and nanobubble generators are described in further detail in the section entitled "Nanobubbles and Nanobubble Generators".

A second portion 110b of input stream 110 is flowed into a solid-liquid separation module 120 where it is separated into sludge and a liquid stream. Separation of solids and liquids is described in further detail in the section entitled "Solid-Liquid Separation Module".

Although FIG. 1A depicts flow of the input stream 110 into the solid-liquid separation module 120 and the anaerobic reactor 150, methods and systems described herein encompass flowing all of the input stream into the solid-liquid separation module 120 or flowing all of the input stream into the anaerobic reactor 150. Thus, methods and systems described herein encompass flowing all or a portion of the input stream into a solid-liquid separation module or flowing all or a portion of the input stream into an anaerobic reactor.

The liquid stream is flowed into a sludge activation module 130 to produce activated sludge. The sludge activation module 130 can include, e.g., solid-liquid separation elements, biological reactors, or other suitable components. Sludge activation is described in further detail in the section entitled "Sludge Activation Module".

The sludge output from the solid-liquid separation module 120 and the sludge output from the sludge activation module 130 are flowed through nanobubble generators 160a and 160b, respectively, to produce nanobubble-containing sludge.

Nanobubble-containing sludge can then be thickened in a thickener 140. Sludge thickening is described in further detail in the section entitled "Sludge Thickening".

Thickened sludge can be flowed through a nanobubble generator 160c to produce thickened nanobubble-containing sludge, which can then be anaerobically digested in anaerobic reactor 150. In some examples, nanobubbles are generated in sludge only before the thickening of the sludge. In some examples, nanobubbles are generated in sludge only after the thickening of the sludge. In some examples, as illustrated in FIG. 1A, nanobubbles are generated in sludge both before and after the thickening of the sludge. Alternatively, or in addition to, nanobubbles can be generated in sludge during thickening of the sludge. In such instances, nanobubbles can be generated in sludge during thickening of the sludge in a sludge holding tank, in an equalization tank, or in other suitable sludge thickeners.

Figure 1B:
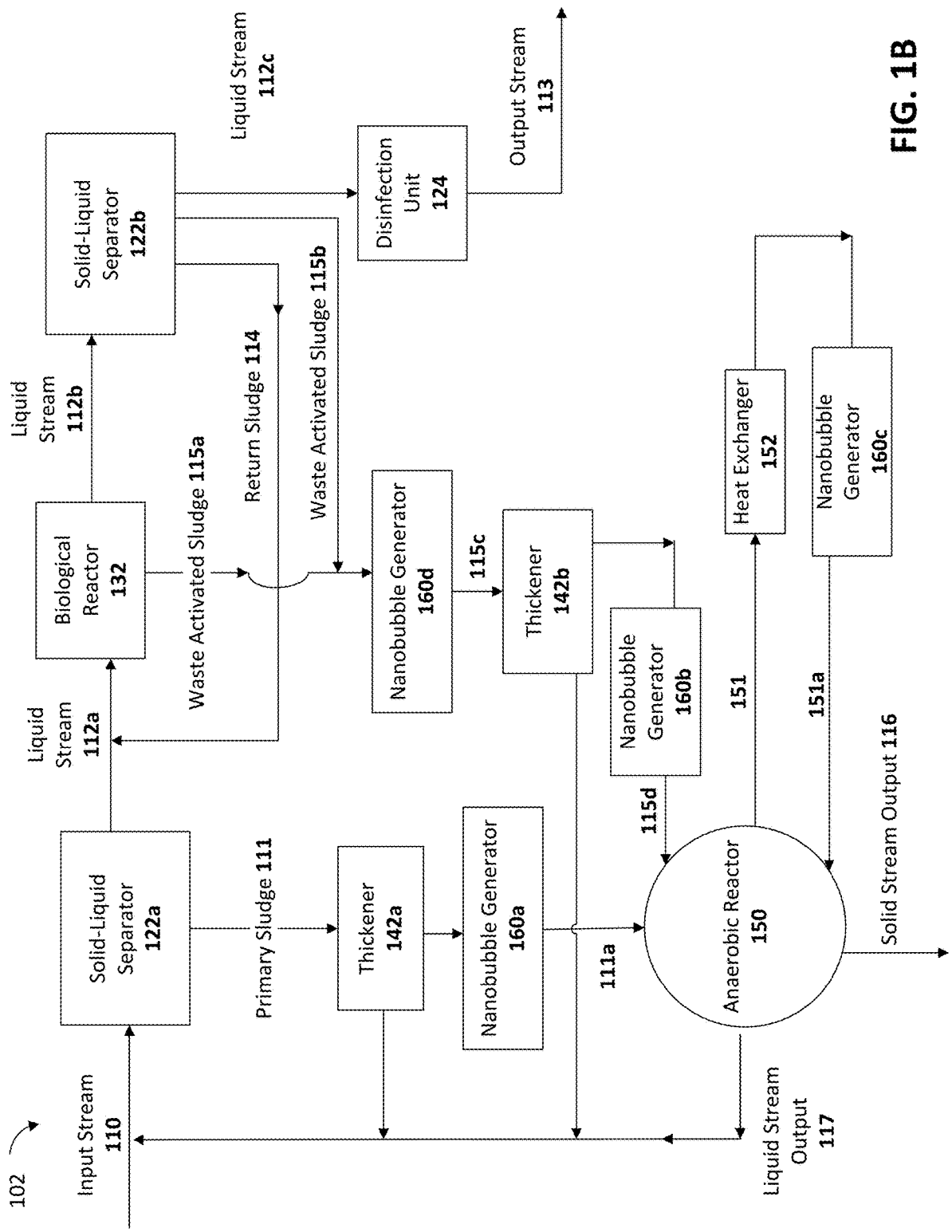

Referring to FIG. 1B, an example method for treating wastewater sludge with nanobubbles in an example wastewater treatment system 102 is described.

An input stream 110 is flowed into a solid-liquid separator 122a. The input stream 110 can include wastewater input to the wastewater system 102. Alternatively, or in addition, output streams from one or more components of wastewater system 102 can be flowed into the solid-liquid separator 122a. For instance, as illustrated in FIG. 1B, a liquid stream output 117 from anaerobic reactor 150 is joined with the input stream 110 and flowed into the solid-liquid separator 122a. In some examples, a portion of the input stream 110 is flowed directly into the anaerobic reactor 150.

The input stream 110 is separated into a liquid stream 112a and primary sludge 111 in the solid-liquid separator 122a. The input stream can be separated using one or more of a clarifier, chemically enhanced primary treatment, high-rate clarification, primary effluent filtration, primary filtration, rotating belt filtration, microscreens, dissolved air flotation clarifier, gravity-based filtration, or other suitable liquid-solid separation techniques. The primary sludge 111 has a higher solids content than the input stream 110.

The liquid stream 112a is flowed into a biological reactor 132 where it is processed into liquid stream 112b and waste activated sludge 115a. The liquid stream 112a can be processed in the biological reactor 132, e.g., under aerobic and/or anoxic conditions. The waste activated sludge 115a has a higher solids content than the liquid stream 112a, the input stream 110, or both. In some examples, the system 102 does not include the solid-liquid separator 122a, and the input stream 110 is flowed directly into the biological reactor 132.

Nanobubbles can be generated in primary sludge 111 and/or waste activated sludge 115a, producing nanobubble-containing sludge. Alternatively, or in addition to, and as illustrated in FIG. 1B, primary sludge 111 and/or waste activated sludge 115a can be thickened and nanobubbles can be generated in the thickened primary sludge and/or thickened activated sludge, also producing nanobubble-containing sludge. Primary sludge 111 and/or waste activated sludge 115a can be thickened by processing the sludge using one or more of dissolved air flotation, a centrifuge, a gravity belt thickener, gravity, a rotary drum thickener, or other suitable thickening techniques.

As shown in FIG. 1B, primary sludge 111 produced in the solid-liquid separator 122a is thickened in a thickener 142a and nanobubbles are generated in the thickened primary sludge using nanobubble generator 160a, producing nanobubble-containing primary sludge 111a.

Nanobubbles can be generated in waste activated sludge before thickening, after thickening, or both. For example, as shown in FIG. 1B, nanobubbles are generated in waste activated sludge 115a produced in the biological reactor 132 using a nanobubble generator 160d, producing nanobubble-containing waste activated sludge 115c. Nanobubble-containing sludge 115c is thickened in thickener 142b and nanobubbles are then generated in the thickened waste activated sludge using nanobubble generator 160b, producing nanobubble-containing waste activated sludge 115d. In some examples, only a single nanobubble generator is used to generate nanobubbles in the waste activated sludge 115a, e.g., only the nanobubble generator 160d upstream of the thickener 142b or only the nanobubble generator 160b downstream of the thickener 142b.

The nanobubble generators 160a, 160b, 160c (discussed below), and 160d are, e.g., flow-through nanobubble generators that are disposed along the flow pathway of the sludge, and generate nanobubbles directly in the sludge. Other types of nanobubble generators, such as submersible nanobubble generators, can also be used.

The liquid stream 112b output from the biological reactor 132 is processed into a liquid stream 112c, waste activated sludge 115b, and return sludge 114 in a solid-liquid separator 122b, e.g., using one or more of a secondary clarifier or membrane filtration. In the illustrated example, the waste activated sludge 115b output from the solid-liquid separator 122b joins the waste activated sludge 115a produced in the biological reactor 132. The combined waste activated sludge, referred to collectively as waste activated sludge 115, is processed through the nanobubble generator 160d, the thickener 142b, and the nanobubble generator 160b to thereby produce nanobubble-containing waste activated sludge 115d. Return sludge 114 is returned to the biological reactor 132 for processing into return activated sludge. In some examples, only the waste activated sludge 115a from the biological reactor 132 is processed through the nanobubble generators and thickener, and all of the sludge output from the solid-liquid separator 122b is returned to the biological reactor 132. In some examples, separate nanobubble generators, thickeners, or both are used for processing of each of waste activated sludge 115a and waste activated sludge 115b.

In the illustrated example, liquid stream 112c is flowed into a disinfection unit 124 where neutralization of pathogens in the liquid stream 112c is performed. Output from the disinfection unit 124 exits wastewater system 102 as an output stream 113. In some embodiments, the liquid stream 112c is flowed out of the wastewater treatment system described herein without performing a disinfection treatment. For example, the liquid stream can be flowed out of the wastewater treatment system and into the environment.

Primary sludge 111 and/or waste activated sludge 115, one or both of which contain nanobubbles (e.g., nanobubble-containing primary sludge 111a and nanobubble-containing waste activated sludge 115d), are anaerobically processed, e.g., digested, in anaerobic reactor 150. Nanobubbles are generated in wastewater sludge 151 output from anaerobic reactor 150 using nanobubble generator 160c, thereby producing nanobubble-containing recirculation sludge 151a. The nanobubble generator 160c is a flow-through nanobubble generator that are disposed along the recirculation flow pathway of the sludge from and back to anaerobic reactor 150.

Wastewater sludge output from an anaerobic reactor can be heated or cooled before and/or after generating nanobubbles in the wastewater sludge. For example, as shown in FIG. 1B, wastewater sludge 151 output from anaerobic reactor 150 is heated or cooled prior to generating nanobubbles in the wastewater sludge. In such instances, wastewater sludge 151 output from anaerobic reactor 150 can be heated or cooled by flowing the wastewater sludge 151 from the anaerobic reactor 150 through a heat exchanger 152.

Output from the anaerobic reactor 150 can be further processed in wastewater treatment system 102. As shown in FIG. 1B, liquid stream output 117 from anaerobic reactor 150 is flowed into solid-liquid separator 122a for processing into primary sludge 111 and liquid stream 112a. Alternatively, or in addition to, output from anaerobic reactor 150 can be output from wastewater treatment system 102. As shown in FIG. 1B, solid stream output 116 from anaerobic reactor 150 is flowed out of wastewater treatment system 102.

Figure 1C:
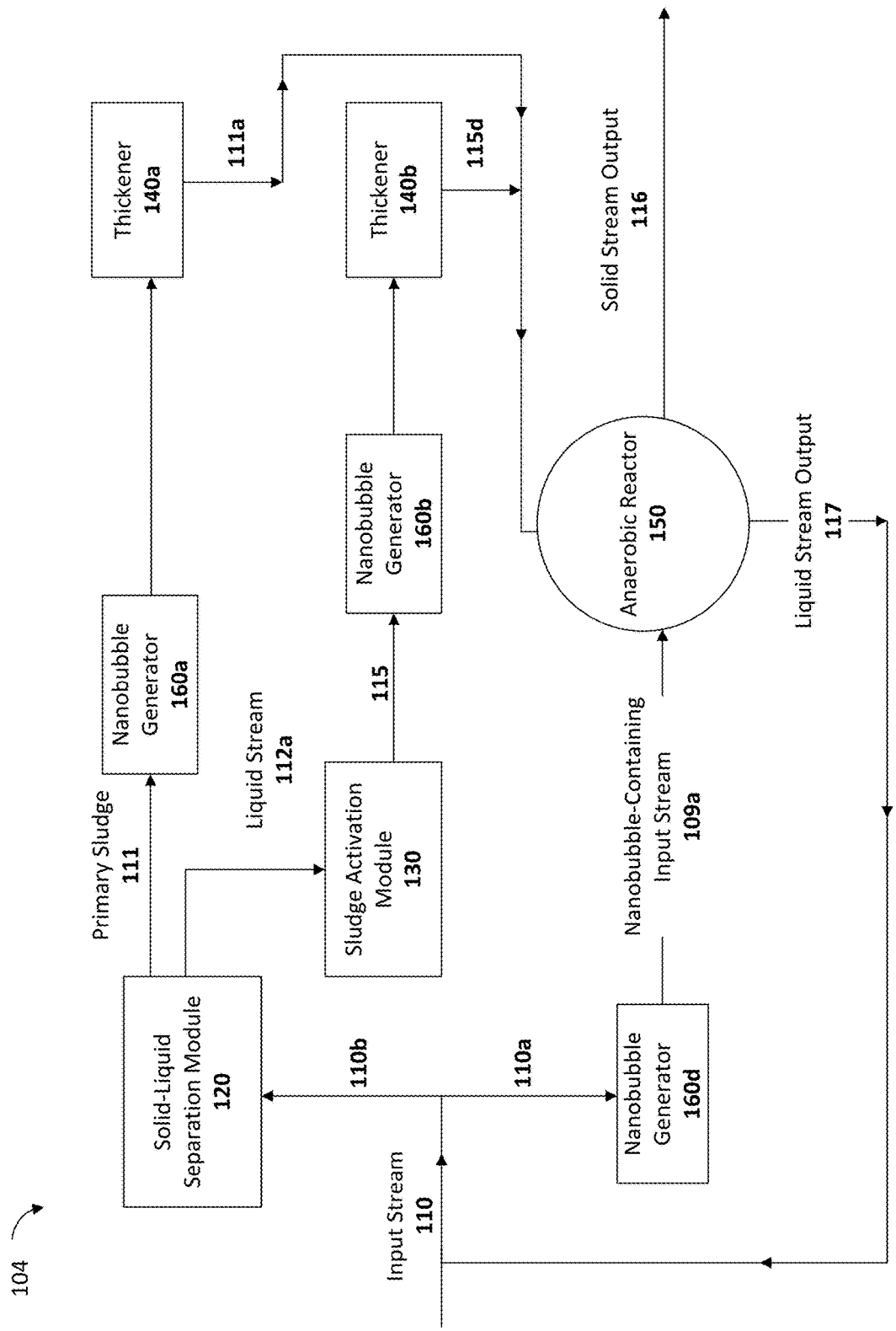

Any of the methods and systems described herein can include generating nanobubbles in the input stream. Referring to FIG. 1C, an example method for treating the input stream and wastewater sludge with nanobubbles in an example wastewater treatment system 104 is described.

A first portion 110a of input stream 110 is flowed into nanobubble generator 160d to produce a nanobubble-containing input stream 109a. Anaerobic processing, e.g., digestion, of the nanobubble-containing input stream 109a is performed in anaerobic reactor 150. Output from anaerobic reactor 150 can be processed in wastewater treatment system 104. As shown in FIG. 1C, liquid stream output 117 from anaerobic reactor 150 is joined with input stream 110 for further processing in wastewater treatment system 104. Alternatively, or in addition to, output from anaerobic reactor 150 can be output from wastewater treatment system 104. As shown in FIG. 1C, solid stream output 116 from anaerobic reactor 150 is flowed out of wastewater treatment system 102.

A second portion 110b of input stream 110 is flowed into the solid-liquid separation module 120 where it is separated into primary sludge 111 and liquid stream 112a. Liquid stream 112a is processed in the sludge activation module 130 to produce waste activated sludge 115. Primary sludge 111 and waste activated sludge 115 are processed as described above for FIG. 1B, e.g., nanobubbles are generated in primary sludge 111a and/or waste activated sludge 115 to generate nanobubble-containing sludge 111a and/or nanobubble-containing waste activated sludge 115d, the nanobubble-containing sludges are thickened in thickeners 142a and 142b, respectively, and the nanobubble-containing sludges are processed in anaerobic reactor 150.

Although not illustrated, wastewater sludge output from anaerobic reactor 150 can be processed to produce nanobubble-containing recirculation sludge, which is returned to anaerobic reactor 150, e.g., as described for FIG. 1B. Other elements of the system 102 of FIG. 1B can also be incorporated into the system 104 of FIG. 1C.

The present disclosure also provides wastewater treatment methods that involve generating nanobubbles in wastewater sludge and/or an input stream to a wastewater treatment system.

Figure 2A:
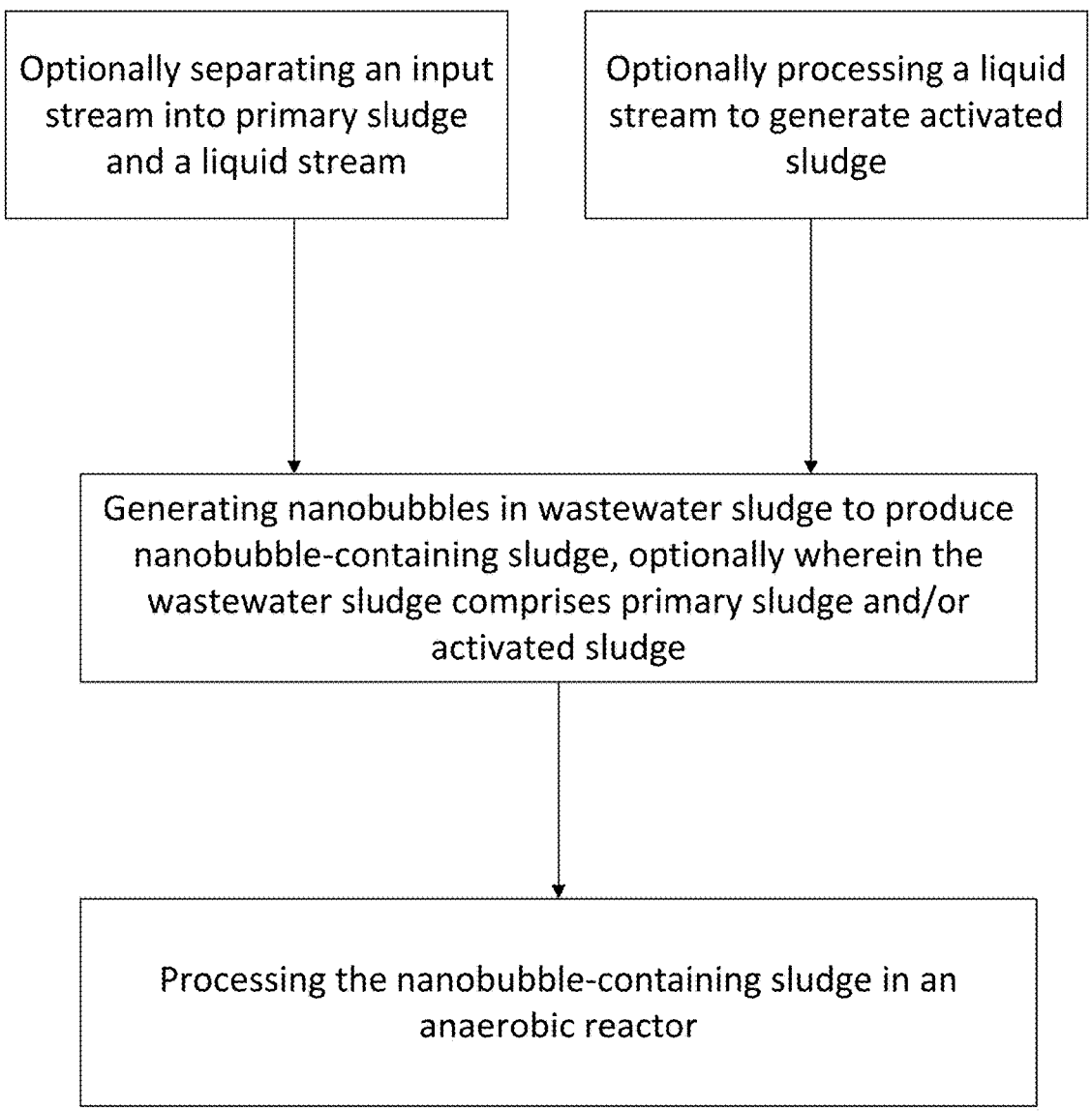
FIGS. 2A-2D are flow charts of example methods for treating wastewater sludge with nanobubbles.

In an example, as shown in FIG. 2A, methods described herein can include generating nanobubbles in wastewater sludge to produce nanobubble-containing sludge, and processing the nanobubble-containing sludge in an anaerobic reactor. Such methods can include generating nanobubbles in primary sludge and/or activated sludge to produce nanobubble-containing primary sludge and/or nanobubble-containing activated sludge. Accordingly, in some embodiments, methods described herein further comprise separating an input stream into primary sludge and a liquid stream and/or processing a liquid stream to generate activated sludge. The primary sludge and the activated sludge have a higher solids content than the input stream and the liquid stream.

Figure 2B:
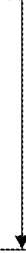

In an example, as shown in FIG. 2B, methods described herein can include generating nanobubbles in wastewater sludge to produce nanobubble-containing sludge, in which a dissolved oxygen content of the wastewater sludge is substantially the same as a dissolved oxygen content of the nanobubble-containing sludge, and processing the nanobubble-containing sludge in an anaerobic reactor. For example, methods described herein can include generating nanobubble of an oxygen containing gas such as air in wastewater sludge to produce nanobubble-containing sludge, in which a dissolved oxygen content of the wastewater sludge is substantially the same as a dissolved oxygen content of the nanobubble-containing sludge, and processing the nanobubble-containing sludge in an anaerobic reactor.

Figure 2C:
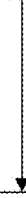

In an example, as shown in FIG. 2C, methods described herein can include generating nanobubbles in wastewater sludge to produce nanobubble-containing sludge, in which the wastewater sludge has a solids concentration of between at least 1,200 mg/L and at least 90,000 mg/L, and processing the nanobubble-containing sludge in an anaerobic reactor. For example, methods described herein can include generating nanobubbles of an oxygen containing gas such as air in wastewater sludge to produce nanobubble-containing sludge, in which the wastewater sludge has a solids concentration of between at least 1,200 mg/L and at least 90,000 mg/L, and processing the nanobubble-containing sludge in an anaerobic reactor.

In some embodiments, the wastewater sludge has a solids concentration of between 1,200 mg/L and 90,000 mg/L, e.g., between 2,400 mg/L and 90,000 mg/L, between 3,600 mg/L and 90,000 mg/L, between 4,800 mg/L and 90,000 mg/L, between 10,000 mg/L and 90,000 mg/L, between 20,000 mg/L and 90,000 mg/L, between 30,000 mg/L and 90,000 mg/L, between 40,000 mg/L and 90,000 mg/L, between 50,000 mg/L and 90,000 mg/L, between 60,000 mg/L and 90,000 mg/L, between 70,000 mg/L and 90,000 mg/L, between 80,000 mg/L and 90,000 mg/L, between 1,200 mg/L and 80,000 mg/L, between 1,200 mg/L and 70,000 mg/L, between 1,200 mg/L and 60,000 mg/L, between 1,200 mg/L and 50,000 mg/L, between 1,200 mg/L and 40,000 mg/L, between 1,200 mg/L and 30,000 mg/L, between 1,200 mg/L and 20,000 mg/L, between 1,200 mg/L and 10,000 mg/L, between 1,200 mg/L and 4,800 mg/L, between 1,200 mg/L and 3,600 mg/L, or between 1,200 mg/L and 2,400 mg/L.

Figure 2D:
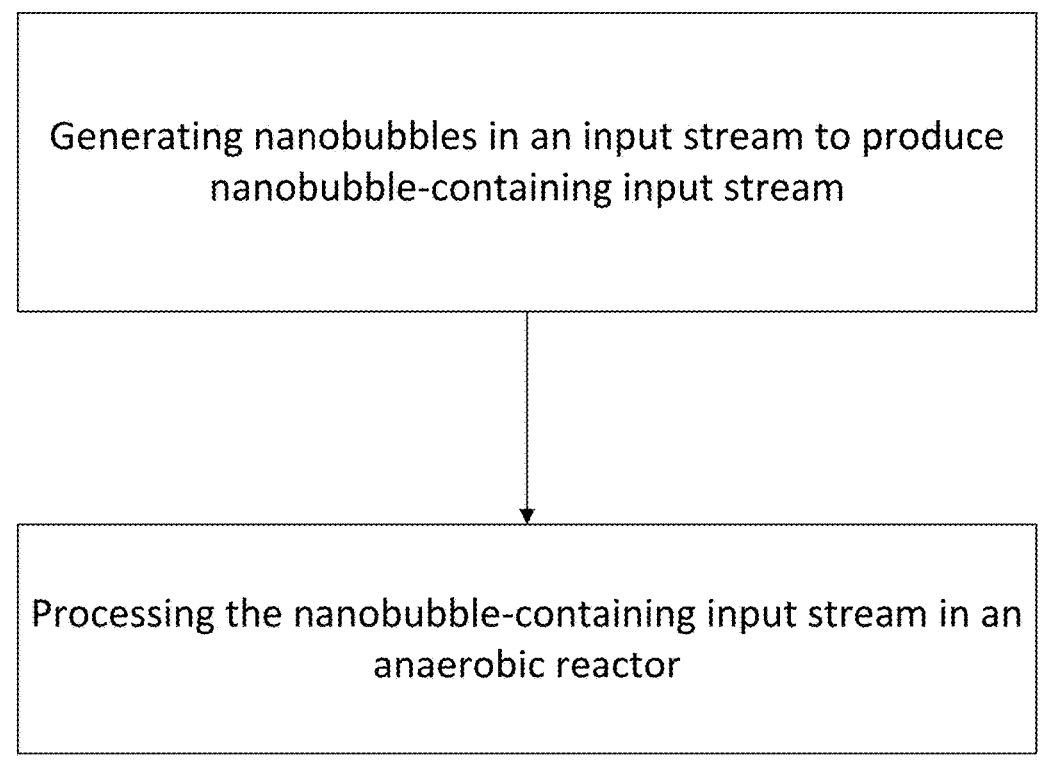

In an example, as shown in FIG. 2D, methods described herein can include generating nanobubbles in an input stream to produce a nanobubble-containing input stream, and processing the nanobubble-containing input stream in an anaerobic reactor.

Methods and systems described herein encompass generating nanobubbles in any wastewater sludge. As used herein, the term "wastewater sludge" or "sludge" refers to any solid, semi-solid, or liquid waste material or precipitate produced by wastewater treatment processes. In some embodiments, wastewater sludge has a higher solids content than an input stream to a wastewater treatment system. In some embodiments, the input stream to the wastewater treatment system includes municipal wastewater and/or industrial wastewater.

In some embodiments, the wastewater sludge comprises waste activated sludge having a solids concentration of at least 1,200 mg/L, e.g., at least 1,300 mg/L, at least 1,400 mg/L, at least 1,500 mg/L, at least 1,600 mg/L, at least 1,700 mg/L, at least 1,800 mg/L, at least 1,900 mg/L, at least 2,000 or more.

In some embodiments, prior to thickening, the wastewater sludge comprises waste activated sludge having a solids concentration of at least 4,800 mg/L, e.g., at least 4,900 mg/L, at least 5,000 mg/L, at least 5,100 mg/L, at least 5,200 mg/L, at least 5,300 mg/L, at least 5,400 mg/L, at least 5,500 mg/L, at least 5,600 mg/L, at least 5,700 mg/L, at least 5,800 mg/L, at least 5,900 mg/L, at least 6,000 mg/L or more.

In some embodiments, after thickening, the wastewater sludge comprises waste activated sludge having a solids concentration of at least 45,000 mg/L, e.g., at least 46,000 mg/L, at least 47,000 mg/L, at least 48,000 mg/L, at least 49,000 mg/L, at least 50,000 mg/L, at least 55,000 mg/L, at least 60,000 mg/L, or more In some embodiments, before thickening, the wastewater sludge comprises primary sludge having a solids concentration of at least 15,000 mg/L, e.g., at least 16,000 mg/L, at least 17,000 mg/L, at least 18,000 mg/L, at least 19,000 mg/L, at least 20,000 mg/L, at least 25,000 mg/L, at least 30,000 mg/L, or more.

In some embodiments, after thickening, the wastewater sludge comprises primary sludge having a solids concentration of at least 45,000 mg/L, e.g., at least 46,000 mg/L, at least 47,000 mg/L, at least 48,000 mg/L, at least 49,000 mg/L, at least 50,000 mg/L, at least 55,000 mg/L, at least 60,000 mg/L, or more.

In some embodiments, the wastewater sludge has a solids concentration of at least 15,000 mg/L, e.g., at least 16,000 mg/L, at least 17,000 mg/L, at least 18,000 mg/L, at least 19,000 mg/L, at least 20,000 mg/L, at least 25,000 mg/L, at least 30,000 mg/L, or more. In some embodiments, wastewater sludge having a solids concentration of at least 15,000 mg/L is referred to as activated sludge.

In some embodiments, the wastewater sludge has a solids concentration of at least 60,000 mg/L, e.g., at least 60,000 mg/L, at least 65,000 mg/L, at least 70,000 mg/L, at least 75,000 mg/L, at least 80,000 mg/L, at least 90,000 mg/L, or more. In some embodiments, wastewater sludge having a solids concentration of at least 60,000 mg/L is referred to as primary sludge.

In some embodiments, the wastewater sludge has a dry solids content of at least 1.2% by weight, e.g., at least 1.3% by weight, at least 1.4% by weight, at least 1.5% by weight, at least 2.0% by weight, at least 2.5% by weight, at least 3.0% by weight, at least 3.5% by weight, at least 4.0% by weight, at least 4.5% by weight, at least 5.0% by weight, at least 5.5% by weight, at least 6.0% by weight, at least 6.5% by weight, at least 7.0% by weight, at least 7.5% by weight, at least 8.0% by weight, at least 8.5% by weight, at least 9.0% by weight, at least 9.5% by weight, at least 10.0% by weight, or more.

Methods and systems described herein encompass generating nanobubbles in any stream. In some embodiments, the stream comprises biomass. As used herein, the term "biomass" refers to organic material that comes from any living or recently living organism such as plants or animals. Non-limiting examples of biomass include plant biomass (e.g., wood and wood processing waste, e.g., firewood, wood pellets, wood chips, lumber, sawdust, and pulp); agricultural biomass (e.g., agricultural crops and waste materials therefrom, e.g., corn, soybeans, sugar cane, switchgrass, woody plants, algae, and crop and food processing residues); animal biomass (e.g., animal manure, human sewage, municipal solid waste such as paper products, food, cotton products); wastewater sludge (e.g., primary sludge, activated sludge, waste activated sludge, return activated sludge, or combinations thereof), or a combination of any of these.

In some embodiments, the stream (e.g., the biomass) has a solids concentration of at least 1,200 mg/L, e.g., at least 1,300 mg/L, at least 1,400 mg/L, at least 1,500 mg/L, at least 1,600 mg/L, at least 1,700 mg/L, at least 1,800 mg/L, at least 1,900 mg/L, at least 2,000 or more.

In some embodiments, the stream (e.g., the biomass) has a solids concentration of between 1,200 mg/L and 90,000 mg/L, e.g., between 2,400 mg/L and 90,000 mg/L, between 3,600 mg/L and 90,000 mg/L, between 4,800 mg/L and 90,000 mg/L and 90,000 mg/L, between 10,000 mg/L and 90,000 mg/L, between 20,000 mg/L and 90,000 mg/L, between 30,000 mg/L and 90,000 mg/L, between 40,000 mg/L and 90,000 mg/L, between 50,000 mg/L and 90,000 mg/L, between 60,000 mg/L and 90,000 mg/L, between 70,000 mg/L and 90,000 mg/L, between 80,000 mg/L and 90,000 mg/L, between 1,200 mg/L and 80,000 mg/L, between 1,200 mg/L and 70,000 mg/L, between 1,200 mg/L and 60,000 mg/L, between 1,200 mg/L and 50,000 mg/L, between 1,200 mg/L and 40,000 mg/L, between 1,200 mg/L and 30,000 mg/L, between 1,200 mg/L and 20,000 mg/L, between 1,200 mg/L and 10,000 mg/L, between 1,200 mg/L and 4,800 mg/L, between 1,200 mg/L and 3,600 mg/L, or between 1,200 mg/L and 2,400 mg/L.

In some embodiments, prior to incorporating nanobubbles into the stream (e.g., the biomass), the stream has a dissolved oxygen content that is substantially the same as a dissolved oxygen content of the nanobubble-containing stream.

In some embodiments, the stream (e.g., the biomass) has a dry solids content of at least 0.12% by weight, e.g., at least 0.25% by weight, at least 0.5% by weight, at least 0.75% by weight, at least 1% by weight, at least 2.0% by weight, at least 2.5% by weight, at least 3.0% by weight, at least 3.5% by weight, at least 4.0% by weight, at least 4.5% by weight, at least 5.0% by weight, at least 5.5% by weight, at least 6.0% by weight, at least 6.5% by weight, at least 7.0% by weight, at least 7.5% by weight, at least 8.0% by weight, at least 8.5% by weight, at least 9.0% by weight, at least 9.5% by weight, at least 10.0% by weight, or more.

In some embodiments, the stream (e.g., the biomass) has a dry solids content that is between 0.12% and 4.5% by weight, e.g., 0.25% and 4.5% by weight, 0.5% and 4.5% by weight, 0.75% and 4.5% by weight, 1% and 4.5% by weight, 1.5% and 4.5% by weight, 2% and 4.5% by weight, 2.5% and 4.5% by weight, 3% and 4.5% by weight, 3.5% and 4.5% by weight, 4% and 4.5% by weight, 0.12% and 4% by weight, 0.12% and 3.5% by weight, 0.12% and 3% by weight, 0.12% and 2.5% by weight, 0.12% and 2% by weight, 0.12% and 1.5% by weight, 0.12% and 1% by weight, 0.12% and 0.75% by weight, 0.12% and 0.5% by weight, or 0.12% and 0.25% by weight.

In some embodiments, the stream (e.g., the biomass) has a chemical oxygen demand of at least 2,000 mg/L, e.g., at least 5,000 mg/L, at least 25,000 mg/L, at least 50,000 mg/L, at least 75,000 mg/L, at least 100,000 mg/L, at least 250,000 mg/L, at least 500,000 mg/L, at least 750,000 mg/L, at least 1,000,000 mg/L, at least 1,500,000 mg/L, at least 2,000,000 mg/L, at least 2,500,000 mg/L, at least 3,000,000 mg/L, at least 3,500,000 mg/L, at least 4,000,000 mg/L, at least 4,500,000 mg/L, at least 5,000,000 mg/L, or more.

In some embodiments, the stream (e.g., the biomass) has a chemical oxygen demand that is between 2,000 mg/L and 5,000,000 mg/L, e.g., between 5,000 mg/L and 5,000,000 mg/L, between 25,000 mg/L and 5,000,000 mg/L, between 50,000 mg/L and 5,000,000 mg/L, between 75,000 mg/L and 5,000,000 mg/L, between 100,000 mg/L and 5,000,000 mg/L, between 250,000 mg/L and 5,000,000 mg/L, between 500,000 mg/L and 5,000,000 mg/L, between 750,000 mg/L and 5,000,000 mg/L, between 1,000,000 mg/L and 5,000,000 mg/L, between 2,000,000 mg/L and 5,000,000 mg/L, between 3,000,000 mg/L and 5,000,000 mg/L, between 4,000,000 mg/L and 5,000,000 mg/L, between 2,000 mg/L and 4,000,000 mg/L, between 2,000 mg/L and 3,000,000 mg/L, between 2,000 mg/L and 2,000,000 mg/L, between 2,000 mg/L and 1,000,000 mg/L, between 2,000 mg/L and 750,000 mg/L, between 2,000 mg/L and 500,000 mg/L, between 2,000 mg/L and 250,000 mg/L, between 2,000 mg/L and 100,000 mg/L, between 2,000 mg/L and 75,000 mg/L, between 2,000 mg/L and 50,000 mg/L, between 2,000 mg/L and 25,000 mg/L, or between 2,000 mg/L and 5,000 mg/L.

In some embodiments, the stream (e.g., the biomass) has a biological oxygen demand of at least 1,000 mg/L, at least 5,000 mg/L, at least 25,000 mg/L, at least 50,000 mg/L, at least 75,000 mg/L, at least 100,000 mg/L, at least 250,000 mg/L, at least 500,000 mg/L, at least 750,000 mg/L, at least 1,000,000 mg/L, at least 1,500,000 mg/L, at least 2,000,000 mg/L, at least 2,500,000 mg/L, or more.

In some embodiments, the stream (e.g., the biomass) has a biological oxygen demand that is between 1,000 mg/L and 2,500,000 mg/L, e.g., between 5,000 mg/L and 2,500,000 mg/L, between 25,000 mg/L and 2,500,000 mg/L, between 50,000 mg/L and 2,500,000 mg/L, between 75,000 mg/L and 2,500,000 mg/L, between 100,000 mg/L and 2,500,000 mg/L, between 250,000 mg/L and 2,500,000 mg/L, between 500,000 mg/L and 2,500,000 mg/L, between 750,000 mg/L and 2,500,000 mg/L, between 1,000,000 mg/L and 2,500,000 mg/L, between 1,500,000 mg/L and 2,500,000 mg/L, between 2,000,000 mg/L and 2,500,000 mg/L, between 1,000 mg/L and 2,000,000 mg/L, between 1,000 mg/L and 1,500,000 mg/L, between 1,000 mg/L and 1,000,000 mg/L, between 1,000 mg/L and 750,000 mg/L, between 1,000 mg/L and 500,000 mg/L, between 1,000 mg/L and 250,000 mg/L, between 1,000 mg/L and 100,000 mg/L, between 1,000 mg/L and 75,000 mg/L, between 1,000 mg/L and 50,000 mg/L, between 1,000 mg/L and 25,000 mg/L, or between 1,000 mg/L and 5,000 mg/L.

Nanobubbles and Nanobubble Generators

Methods and systems described herein involve generating nanobubbles in biomass (e.g., plant biomass, animal biomass, agricultural biomass, wastewater sludge, or a combination thereof) using a nanobubble generator. As used herein, the term "nanobubble" refers to a bubble that has a diameter of less than one micron. A microbubble, which is larger than a nanobubble, is a bubble that has a diameter greater than or equal to one micron and smaller than 50 microns. A macrobubble is a bubble that has a diameter greater than or equal to 50 microns. As used herein, a "nanobubble generator" refers to an apparatus for generating nanobubbles.

Nanobubbles have several unique properties such as high gas solubility into the liquid due to their high internal pressure and long lifetime in liquid due to their negatively charged surfaces. Conversely, micro- and macro-bubbles are larger in size, and thus rise rapidly and burst at the water surface. Accordingly, in some embodiments, the nanobubble-containing sludge includes nanobubbles that are stable in the sludge for at least one month or for at least three months under ambient pressure and temperature.

Any method or apparatus known in the art or described herein can be used to generate nanobubbles in biomass in methods and systems provided herein. Non-limiting examples of methods and apparatuses for generating nanobubbles that can be used in methods and systems described herein are provided in U.S. Pat. Nos. 10,591,231 and 11,331,633, the entire contents of which are herein incorporated by reference for the purposes and subject matter referenced herein.

Methods and systems described herein encompass generating nanobubbles in biomass by flowing the sludge into a nanobubble generator. Alternatively, or in addition to, methods and systems described herein can include generating nanobubbles in biomass by submerging the nanobubble generator in the biomass.

Methods and systems described herein encompass use of one or more nanobubble generators, e.g., 1, 2, 3, 4, 5, 6 or more nanobubble generators. The one or more nanobubble generators can be included in methods and systems described herein as distinct modules or in combination with another module. For example, FIG. 1A shows nanobubble generator 160a-160d as distinct modules of system 100. In another example, one or more nanobubble generators can be included in a solid-liquid separation module, a sludge activation module, a thickener, an anerobic reactor, or a combination thereof.

A nanobubble generator for use in methods and systems described herein is capable of generating a high concentration of nanobubbles in biomass (e.g., plant biomass, animal biomass, agricultural biomass, wastewater sludge, or a combination thereof). In some embodiments, the nanobubble generator can generate nanobubbles at a concentration of at least $10^6$ nanobubbles per $cm^3$. In some embodiments, the nanobubble concentration is at least 107 nanobubbles per $cm^3$, at least 108 nanobubbles per $cm^3$, at least $10^1$ nanobubbles per $cm^3$, at least $10^{10}$ nanobubbles per $cm^3$, or at least $10^{11}$ nanobubbles per $cm^3$.

The nanobubble concentration is expressed as nanobubbles per $cm^3$. It is measured by collecting 3 samples from the nanobubble generator and analyzing each sample within 20 minutes after it has been obtained by Nanoparticle Tracking Analysis using a Nanosight NS3000 analyzer available from Malvern PANalytical. Each sample is filtered using a 0.45 m filter before it is analyzed using the Nanosight NS3000 analyzer.

Any gas can be used to generate nanobubbles in biomass (e.g., plant biomass, animal biomass, agricultural biomass, wastewater sludge, or a combination thereof) according to methods and systems described herein. Non-limiting examples of gases that can be used to generate nanobubbles include air, hydrogen, biogas, methane, carbon dioxide, nitrogen, argon or other inert gases, oxygen, or ozone.

Methods and systems described herein encompass generating nanobubbles in biomass (e.g., plant biomass, animal biomass, agricultural biomass, wastewater sludge, or a combination thereof) with little to no detectable increase in dissolved oxygen content of the sludge. Thus, in some embodiments, a dissolved oxygen content of the biomass (e.g., plant biomass, animal biomass, agricultural biomass, wastewater sludge, or a combination thereof) is substantially the same as a dissolved oxygen content of the nanobubble-containing sludge.

As used herein, a dissolved oxygen content of the biomass (e.g., plant biomass, animal biomass, agricultural biomass, wastewater sludge, or a combination thereof) is "substantially the same" as a dissolved oxygen content of the nanobubble-containing biomass if there is no detectable difference between the dissolved oxygen content of the biomass (e.g., plant biomass, animal biomass, agricultural biomass, wastewater sludge, or a combination thereof) and that of the nanobubble-containing biomass. Any method or apparatus can be used to detect a dissolved oxygen content of the biomass, e.g., a dissolved oxygen (DO) sensor or the Winkler method.

Anaerobic Digestion and Anaerobic Reactors

Methods and systems described herein involve anaerobic digestion of nanobubble-containing biomass using an anaerobic reactor. As used herein, the term "anaerobic digestion" refers to processes in which microorganisms break down organic material such as sludge in the absence of or near absence of oxygen to form hydrogen, methane, and other products. As used herein, a "anaerobic reactor" refers to an apparatus for performing anaerobic digestion.

Methods and systems described herein can include one or more anaerobic reactors. Any anaerobic reactor known in the art or described herein can be used in the methods and systems described herein. For instance, the anaerobic reactor can be an anaerobic digester, a lagoon (e.g., a facultative lagoon), an up-flow anaerobic sludge bed, a tank, or another type of anaerobic reactor. In some embodiments, the anaerobic reactor is configured to process nanobubble-containing sludge. In such instances, the anaerobic reactor can output a filtrate and a solid digestate.

Any type of biomass can be anaerobically digested in an anaerobic reactor using the methods and systems described herein. In some embodiments, methods described herein include anaerobic digestion of nanobubble-containing biomass (e.g., plant biomass, animal biomass, agricultural biomass, wastewater sludge, or a combination thereof).

The biomass for the anaerobic digestion processes described here can be any type of biomass. For instance, the biomass can be biomass from forestry products or derivatives thereof, such as biomass from woody crops such as trees or tree products (e.g., sawdust); paper, pulp, or cardboard; lignin, cellulose, or hemicellulose; or other forestry products or derivatives. The biomass can be biomass of agricultural products, such as biomass of arable crops or grains, e.g., biomass of corn, millet, clover, rapeseed, sunflower, sugarcane, sorghum, flour, or other crops or grains. The biomass can be biomass of agricultural waste, such as biomass of straws, fibers, or husks (e.g., of rice, corn, or wheat); pomace, oil cakes, or grain stillage; or other agricultural waste. The biomass can be biomass of food byproducts or food waste, such as biomass of starch, sugars, proteins, fats, whey, or other food byproducts or waste. The biomass can be biomass of animal waste, such as sludge of manure or shrimp sludge.

Various types of anaerobic digesters can be implemented for the anaerobic digestion processes described here, such as mesophilic anaerobic digesters, thermophilic anaerobic digesters, psychrophilic anaerobic digesters, single stage or two-stage anaerobic digesters, batch or continuous anaerobic digesters, wet or dry type anaerobic digesters, high or low rate anaerobic digesters, or attached growth or suspended growth anaerobic digesters, among other examples.

Solid-Liquid Separation Module

Methods and systems described herein involve separating an input stream into solids and liquids in a solid-liquid separation module. The input stream can include an input stream to a system (e.g., a wastewater treatment system, an energy production system, a fertilizer production system, or an anaerobic fermentation system) and/or an output stream from one or more components of the system (e.g., the wastewater treatment system, an energy production system, a fertilizer production system, or an anaerobic fermentation system).

In some embodiments, the solid-liquid separation module comprises a solid-liquid separator for separating solids and liquids. As used herein, the term "solid-liquid separator" refers to an apparatus for separating an input stream to a system (e.g., a wastewater treatment system, an energy production system, a fertilizer production system, or an anaerobic fermentation system) and/or an output stream from one or more components of the system (e.g., the wastewater treatment system, an energy production system, a fertilizer production system, or an anaerobic fermentation system) into solid and liquid components.

Methods and systems described herein can include one or more solid-liquid separators. Any solid-liquid separator known in the art or described herein can be used in the methods and systems described herein. Non-limiting examples of methods and apparatuses for separating solid and liquid components for use in methods and systems described herein include a clarifier, chemically enhanced primary treatment, high-rate clarification, primary effluent filtration, primary filtration, rotating belt filtration, microscreens, dissolved air flotation clarifier, gravity-based separation, or combinations thereof.

Any stream can be separated into solids and liquids in a solid-liquid separator using the methods and systems described herein. In some embodiments, methods described herein include separating a liquid stream of a system (e.g., a wastewater treatment system, an energy production system, a fertilizer production system, or an anaerobic fermentation system) into a solid stream such as sludge (e.g., primary sludge) and a liquid stream. Alternatively, or in addition to, methods described herein include separating a liquid stream into a solid stream such as sludge (e.g., return sludge) and another liquid stream.

Sludge Activation Module

Methods and systems described herein involve activating sludge using a sludge activation module. As used herein, the term "sludge activation" refers to processes in which organic and inorganic pollutants are converted into biomass suspended in liquid, which are separated to produce waste activated sludge and a liquid stream. In some embodiments, sludge activation is performed under aerobic conditions.

In some embodiments, the sludge activation module comprises a biological reactor for producing activated sludge (e.g., waste activated sludge, return activated sludge). As used herein, the term "biological reactor" refers to an apparatus for producing activated sludge. In some embodiments, the biological reactor includes an anaerobic zone, an anoxic zone, or both.

Methods and systems described herein can include one or more biological reactors. Any biological reactor for producing activated sludge known in the art or described herein can be used in the methods and systems described herein.

Any input stream can be processed into activated sludge in a biological reactor using the methods and systems described herein. In some embodiments, methods described herein include processing a liquid stream into waste activated sludge and another liquid stream. Alternatively, or in addition to, methods described herein include returning activated sludge to the biological reactor and processing the activated sludge into return activated sludge.

Biomass Thickening

Methods and systems described herein involve biomass thickening using a thickener. As used herein, the term "biomass thickening" refers to processes that increase the solids concentration and decrease the free water. As used herein, a "thickener" refers to an apparatus for thickening biomass including, but not limited to, a centrifuge, a gravity belt thickener, gravity, and a rotary drum thickener.

In some embodiments, the thickener can be included in a sludge holding tank. Alternatively, or in addition to, the thickener can be included in an equalization tank. Accordingly, in some embodiments, methods described herein encompass thickening biomass in a sludge holding tank, an equalization tank, or both. In some embodiments, methods described herein encompass thickening biomass and generating nanobubbles in biomass in a sludge holding tank, an equalization tank, or both.

Methods and systems described herein can include one or more thickeners. Any thickener known in the art or described herein can be used in the methods and systems described herein. In some embodiments, thickening the biomass comprises processing the biomass using one or more of dissolved air flotation, a centrifuge, a gravity belt thickener, gravity, or a rotary drum thickener. In some embodiments, thickening the biomass comprises producing a solids stream (e.g., a sludge) and a liquid stream, and then providing the liquid stream to a separator that separates the sludge from the input. In such instances, the separator can comprise a clarifier, a membrane, or a combination thereof.

Any type of biomass can be thickened in the methods and systems described herein. In some embodiments, methods described herein include thickening nanobubble-containing biomass. In some embodiments, methods described herein include thickening plant biomass, animal biomass, agricultural biomass, wastewater sludge, or a combination thereof. In some embodiments, methods described herein include thickening any type of wastewater sludge such as primary sludge, activated sludge, return sludge, or combinations thereof.

Particular embodiments of the subject matter have been described. Other embodiments are within the scope of the following claims.

What is claimed is:

1. A method comprising:
generating nanobubbles directly in a stream of a system to produce a nanobubble-containing stream using at least one nanobubble generator, wherein the stream has a solid concentration of at least 1,200 mg/L;
introducing the nanobubble-containing stream to an anaerobic reactor of the system; and
anaerobically processing the nanobubble-containing stream in an anaerobic reactor of the system.

2. The method of claim 1, wherein a dissolved oxygen content of the stream before the nanobubble generation is the same as a dissolved oxygen content of the nanobubble-containing stream.

3. The method of claim 1, wherein the stream has a solid concentration that is between 1,200 mg/L and 90,000 mg/L.

4. The method of claim 1, wherein the stream has a dry solid content of at least 0.12% by weight.

5. The method of claim 1, wherein the stream has a dry solid content that is between 0.12% and 4.5% by weight.

6. The method of claim 1, wherein a gas in the nanobubbles is selected from air, argon, hydrogen, biogas, methane, carbon dioxide, nitrogen, oxygen, and ozone.

7. The method of claim 1, wherein the stream comprises biomass.

8. The method of claim 7, wherein the biomass comprises plant biomass, animal biomass, agricultural biomass, wastewater sludge, or a combination thereof.

9. The method of claim 1, wherein the system is a wastewater treatment system, an energy production system, a fertilizer production system, or an anaerobic fermentation system.

10. The method of claim 1, wherein the system is a wastewater treatment system, and the stream comprises wastewater sludge.

11. A method comprising:
generating nanobubbles directly in a stream of a system to produce a nanobubble-containing stream using at least one nanobubble generator, wherein the stream has a chemical oxygen demand of at least 2,000 mg/L and/or the stream has a biological oxygen demand of at least 1,000 mg/L;
introducing the nanobubble-containing stream to an anaerobic reactor of the system; and
anaerobically processing the nanobubble-containing stream in an anaerobic reactor of the system.

12. The method of claim 11, wherein the stream has a chemical oxygen demand that is between 2,000 mg/L and 5,000,000 mg/L.

13. The method of claim 11, wherein the stream has a biological oxygen demand that is between 1,000 mg/L and 2,500,000 mg/L.

* * * * *